United States Patent [19]

Buxton et al.

[11] Patent Number: 5,636,348
[45] Date of Patent: Jun. 3, 1997

[54] CONTROL SYSTEM FOR A MULTIPLE MODE STANDARD PARALLEL PORT FOR A PERSONAL COMPUTER

[75] Inventors: Clark L. Buxton; Robert A. Kohtz, both of St. Joseph, Mich.

[73] Assignee: Zenith Data Systems Corporation, Sacramento, Calif.

[21] Appl. No.: 361,463

[22] Filed: Dec. 21, 1994

Related U.S. Application Data

[63] Continuation of Ser. No. 885,804, May 15, 1992, abandoned.

[51] Int. Cl.⁶ .................................................. G06F 13/14
[52] U.S. Cl. .................... 395/285; 395/831; 395/834; 395/881; 395/884; 395/500
[58] Field of Search ............................... 395/285, 286, 395/831, 832, 845, 856, 880, 881, 882, 834, 884

[56] References Cited

U.S. PATENT DOCUMENTS

| | | | |
|---|---|---|---|
| 3,970,997 | 7/1976 | Daly et al. | 395/880 |
| 4,476,527 | 10/1984 | Clayton, IV | 395/849 |
| 4,509,113 | 4/1985 | Heath | 395/886 |
| 4,682,304 | 7/1987 | Tierney | 395/872 |
| 4,837,677 | 6/1989 | Burrus, Jr. et al. | 395/281 |
| 4,972,470 | 11/1990 | Farago | 380/3 |
| 5,142,672 | 8/1992 | Johnson et al. | 395/500 |
| 5,214,760 | 5/1993 | Hammond et al. | 395/250 |
| 5,233,692 | 8/1993 | Gajjar et al. | 395/309 |
| 5,235,685 | 8/1993 | Caldara et al. | 395/308 |
| 5,261,060 | 11/1993 | Free | 395/309 |
| 5,299,314 | 3/1994 | Gates | 395/200.2 |
| 5,303,349 | 4/1994 | Warriner et al. | 395/882 |
| 5,335,338 | 8/1994 | Proesel | 395/500 |
| 5,414,712 | 5/1995 | Kaplan et al. | 371/20.1 |
| 5,438,671 | 8/1995 | Miles | 395/200.01 |

OTHER PUBLICATIONS

"All About Parallel–Port Signals", John Yacono, *Popular Electronics*, Jan. 1992, pp. 38–41 and 94.

"Troubleshooting Parallel Connections", John Yacono, *Popular Electronics*, Feb. 1992, pp. 41–48 and 94.

*Primary Examiner*—Parshotam S. Lall
*Assistant Examiner*—Viet Vu
*Attorney, Agent, or Firm*—Fitch, Even, Tabin & Flannery

[57] ABSTRACT

An enhanced parallel port interface increases the bandwidth of a standard parallel port connector while at the same time maintaining backward compatibility with a standard parallel port interface. In order to increase the data transfer rate, the software overhead is substantially reduced by hardware generated signals. As such, the desirability of using a parallel port bus expansion is greatly increased.

12 Claims, 4 Drawing Sheets

CONTROL SYSTEM FOR A MULTIPLE MODE STANDARD PARALLEL PORT FOR A PERSONAL COMPUTER

This application is a continuation of application Ser. No. 07/885,804 filed May 15, 1992, now abandoned.

BACKGROUND OF THE INVENTION

1. Field of the Invention

The present invention relates to computer systems and more particularly to an enhanced parallel port (EPP) interface which allows for increased performance and bandwidth of a standard parallel port connector while at the same time maintaining compatibility with the existing parallel port interface which includes hardware that enables the software overhead for data transfers to be substantially reduced thus increasing the system performance to enable it to be utilized for bus expansion.

2. Description of the Prior Art

IBM type PC/AT compatible personal computers are provided with a relatively limited number of input/output (I/O) expansion slots to accommodate various I/O devices including additional memory storage devices, tape backup systems, network interface circuits and the like. In order to support a trend of an ever increasing need for expansion capabilities for additional I/O devices, based upon, for example, increased consumer demand for various I/O devices, such as CD-ROMS, various solutions are known. For example, additional I/O devices can be connected to existing expansion slots within personal computers. If existing expansion slots are unavailable, expansion buses are known for providing additional sets of I/O slots. Both IBM type PC/AT compatible and non-compatible (e.g., PCMCIO) expansion buses are known.

With such an arrangement, the addition of the I/O devices, whether supported by existing expansion slots or additional expansion slots created by an expansion bus is relatively cumbersome and generally requires the services of a computer technician which adds to the overall cost of adding an I/O device. In order to avoid such problems, standard parallel ports have been known to be used for expansion capabilities. Although standard parallel ports are undoubtedly the simplest and most cost-effective solution, there are other problems associated with using a parallel port in such an application. More particularly, parallel ports are known to be a relatively slow interface. In particular, parallel ports were developed in the past primarily to support printers whose maximum block transfer rate is about 500 kilobits/sec—assuming no data compression. The block transfer rate is limited by the software overhead required to support data transfers to such devices. For example, 4 to 6 instructions are typically required for transferring data. In particular, a typical transfer may be as follows:

1) write data to data port,
2) assert a strobe signal,
3) check the busy input,
4) if the busy signal is active go to step 3,
5) if the busy signal is inactive clear the strobe,
6) go to step 1 if the block is not transferred.

The problem of relatively slow data transfer through a standard parallel port is not solved by the ever increasing clock speeds of newer IBM type PC/AT compatible computers. In such applications, the number of machine clock cycles per instruction merely increases, thus maintaining generally the same transfer rate.

SUMMARY OF THE INVENTION

It is an object of the present invention to solve various known problems associated with personal computers.

It is another object of the present invention to provide an interface for additional I/O devices that is relatively convenient and does not require the services of a computer technician.

It is yet another object of the present invention to decrease the software overhead required to support data transfers through a standard parallel port connector.

It is yet a further object of the present invention to increase the data transfer rate through a standard parallel port connector.

It is yet a further object of the present invention to provide a special purpose interface for a parallel port connector which maintains compatibility with an existing parallel port interface.

BRIEF DESCRIPTION OF THE DRAWING

These and other objects of the present invention will be readily understood with reference to the following specification and accompanying drawing, wherein.

DETAILED DESCRIPTION OF THE PREFERRED EMBODIMENT

The present invention relates to an enhanced parallel port (EPP) hardware interface which enables the software overhead for block data transfers through a standard parallel port connector to be significantly reduced. As such, the data transfer rate is significantly increased which improves the desirability of a parallel port for bus expansion to support additional I/O devices. In particular, the EPP interface in accordance with the present invention allows for bus expansion rather quickly and inexpensively without the need for a computer technician by allowing various I/O devices and bus expansion devices to be connected directly to a parallel port connector thus obviating the need to access existing expansion slots within the computer housing. For example, due to the increased bandwidth, the EPP interface allows personal computers including portable personal computers to be rather quickly and easily connected to a local area network (LAN) by way of a standard parallel port connector. In addition, due to backward compatibility with standard parallel port interfaces, the EPP interface allows connectors which support multiple I/O, such as a small computer system interface (SCSI), to be connected to a standard parallel port connector.

EPP EXTERNAL ARCHITECTURE

Figure 1:
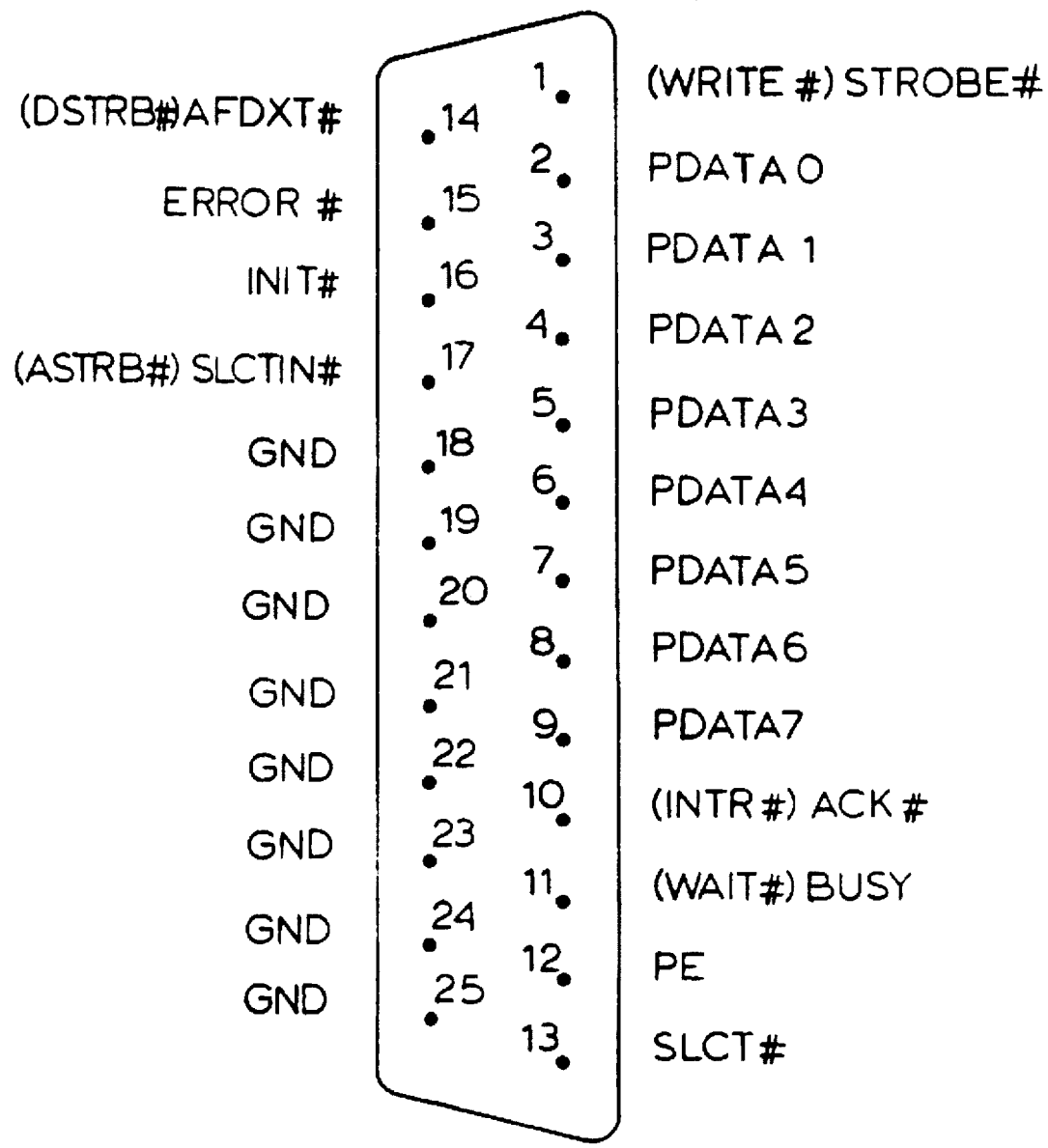
FIG. 1 is a pin-out drawing of a multi-function parallel port connector in accordance with the present invention with alternate pin functions shown in parenthesis.
Figure 2:
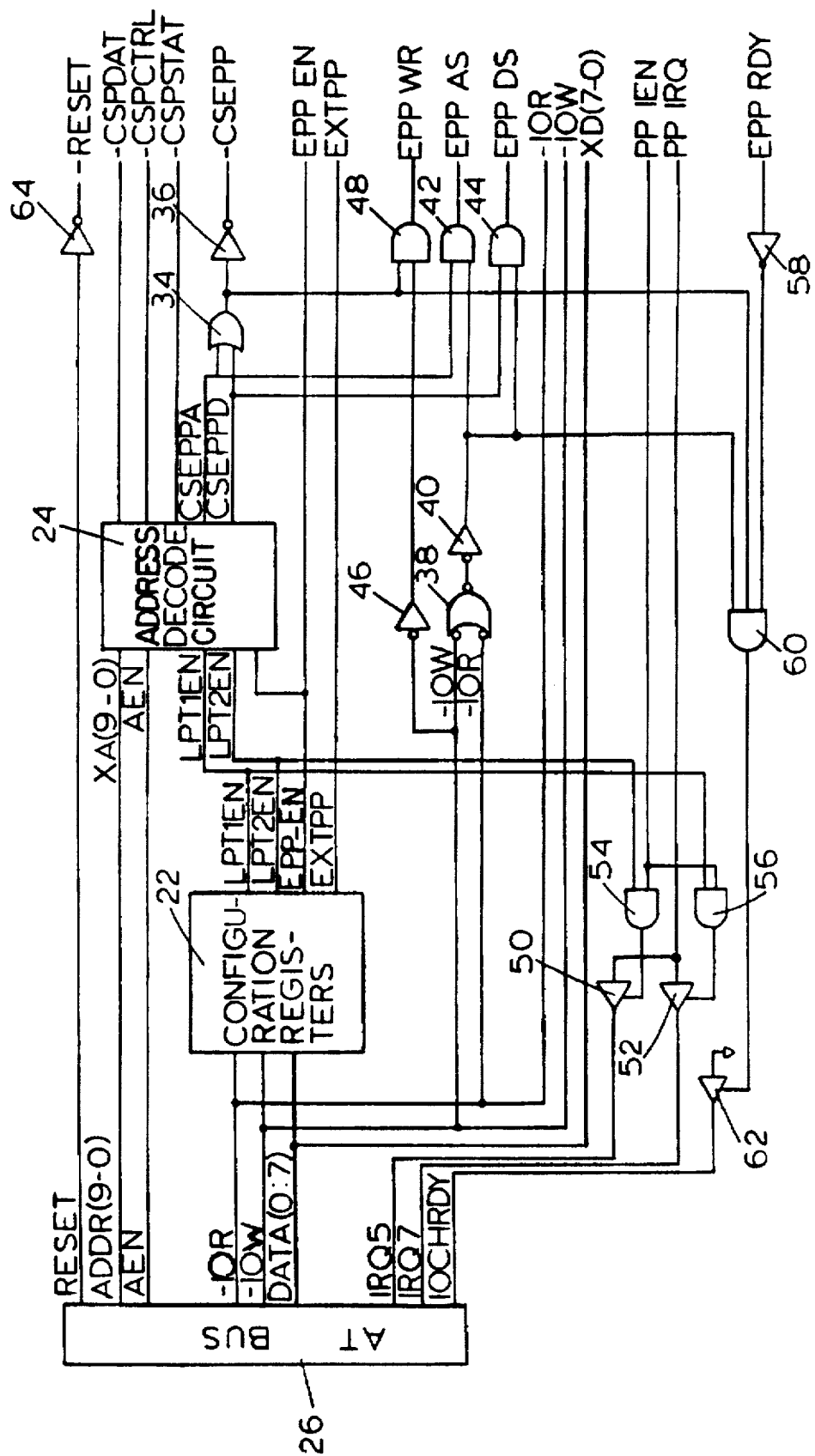
FIG. 2 is a simplified schematic diagram of the address decoding logic and the configuration registers which form a portion of the enhanced parallel port (EPP) interface in accordance with the present invention.

The EPP interface in accordance with the present invention is adapted to be used with a standard 25 pin, D type connector 20 as shown in FIG. 1. The EPP interface circuitry in accordance with the present invention, illustrated in FIGS. 2 and 3, is connected to the connector 20 to support two modes of operation; a normal mode and an EPP mode. In a normal mode of operation, the parallel port connector 20 operates as a standard parallel port interface with the exception that certain pins are driven by CMOS drivers instead of open-drain drivers as will be discussed below. However, these CMOS driven pins are adapted to be used for bi-directional data transfer during a normal mode of operation.

The pin functions during a normal mode of operation are standard as defined in Table 1 below.

TABLE 1

| Pin Number | Signal Name | Description |
|---|---|---|
| 1 | -STROBE | Strobe bit. This active low pulse indicates that the computer is transmitting parallel data. It is used to time the data being sent to the peripheral device. |
| 2–9 | PDATO-PDATA7 | Data bits 0 through 7. These signals are the system buffered and latch data bits. |
| 10 | -ACK | Acknowledge. This active low signal indicates that the peripheral device has received the data. It can be used for hardware handshaking. |
| 11 | BUSY | Busy. This signal indicates that the peripheral device is busy and not ready to receive data. Can be used for hardware handshaking. |
| 12 | PE | Paper End (out). This signal indicates a peripheral fault. It is used by a printer to indicate that it is out of paper. |
| 13 | SLCT | Select. During a normal mode of operation, this is the "LINE PRINTER SELECT IN" output signal. |
| 14 | -AFDXT | Auto Feed. This active low signal requests a paper feed by the peripheral. |
| 15 | -ERROR | Printer Fault. This active low signal indicates that an error condition exists in the peripheral. |
| 16 | -INIT | Initialize. This active low signal is used to initialize the peripheral. |
| 17 | -SLCTIN | Select In. This active low signal is used by the peripheral device to indicate that it has been selected. |
| 18–25 | GND | Ground. |

In an EPP mode of operation, certain of the pin functions are redefined as identified in Table 2. The corresponding standard parallel port signal functions are shown in parenthesis.

TABLE 2

| Pin Number | Signal Name | Description |
|---|---|---|
| 17 | ASTRB# (SLCTIN#) | Address Strobe. During EPP cycles, this active low output signal indicates that the index port, x7BH, is being accessed. Used to latch data on a write or to enable drivers during a read. When EPP mode is enabled, this output is driven by a CMOS driver. During a normal mode of operation, this signal informs the peripheral that it has been selected. |
| 14 | DSTRB# (AFDXT#) | Data Strobe. During EPP cycles, this active low output signal indicates that one of the data ports, x7CH - x7FH, is being |

TABLE 2-continued

| Pin Number | Signal Name | Description |
|---|---|---|
| | | accessed. Used to latch data on a write or enable drivers during a read. When EPP mode is enabled, this output is driven by a CMOS drive. During a normal mode of operation, this is the "Line Printer Auto Line Feed" output signal. |
| 10 | INTR (ACK#) | Interrupt. This active high input signal is used by the peripheral device to generate interrupts. A low on this signal, with the interrupts enabled, will cause the interrupt request signal to the Programmable Interrupt Controller to go active. No added functionality was added to this signal to support EPP mode. The name was changed to more accurately describe this signal's function. During a normal mode of operation, this is the "Line Printer Acknowledge" input signal. |
| 11 | WAIT# (BUSY) | Wait. During EPP cycles, this active low input signal is used to hold the CPU while data is being gathered. WAIT# active will result in the IOCHRDY signal being pulled inactive if either the ASTRB# or DSTRB# signals are active. WAIT# should not be held active for more than 12us while either the ASTRB# or DSTRB# are active. During a normal mode of operation, this is the "Line Printer Busy" input signal. |
| 1 | WRITE# (STROBE#) | Write. This active low output signal indicates that the cycle being conducted across the port is a write to the EPP device. During a normal mode of operation, this is the "Line Printer Strobe" output signal. |
| 15 | (ERROR#) | The function of this signal is not changed in EPP mode. During a normal mode of operation, this is the "Line Printer Error" input signal. |
| 18–25 | GND | System Ground. |
| 16 | (INIT#) | The function of this signal is not changed in EPP mode. During a normal mode of operation, this is the "Line Printer Initialize" output signal. |
| 2–9 | PDATA (7,0) | Parallel Port Data. 8-bit data path used to transfer data. In EPP mode, this is a bidirectional data bus. When WRITE# is active (low), these signals are outputs. In PS/2 mode, the direction is controlled by the Parallel Port Control Register bit 5. During a normal mode of operation, these signals are outputs only. |
| 12 | (PE) | The function of this signal is not changed in EPP mode. During a normal mode of operation, this is the "Line Printer Paper Empty" input signal. |
| 13 | (SLCT#) | The function of this signal is not changed in EPP mode. During a normal mode of operation, this is the "Line Printer Selected" input signal. |

In addition to the connector 20, the external architecture of the EPP interface may also include additional circuitry as illustrated in FIG. 2. However, such circuitry may also be included on-chip with the circuitry illustrated in FIG. 3 to be discussed below.

As shown, the external architecture includes one or more configuration registers 22 and address decoding circuitry 24 that are connected to an AT type system bus 26. The system bus signals which interface with the configuration register 22 and the address decoding circuitry 24 is illustrated in Table 3 below.

TABLE 3

| Signal | Description |
| --- | --- |
| ADDR(9-0) | Active High Address Bus: System address bus used to decode the I/O space. |
| DATA(7-0) | Active High Data Bus: System data bus used to transfer data to and from the port. |
| -IOR | Active Low I/O Read: System strobe used to indicate data being read from I/O location. |
| -IOW | Active Low I/O Write: System strobe used to indicate data being written to an I/O location. |
| AEN | Active High Address Enable: System status signal used to indicate that a DMA or Refresh device has control of the bus. I/O Address decodes should be ignored. |
| IOCHRDY | Active High I/O Channel Ready: System control line used by a peripheral device to indicate that it is ready to send or receive data. If the peripheral device pulls this line low or inactive extra system wait states will be added. |
| IRQ(5,7) | Active High Interrupt: System interrupt line causes processor to jump to interrupt service routine. IRQ7 is used when decoding for LPT1 and IRQ5 is used when decoding LPT2. |

The configuration register 22 is used to enable an EPP mode enable bit, EPP-EN, which may be controlled by the basic input output system (BIOS) software. Various other bits are available from the configuration register 22 for use with the address decode logic 24 and control of the EPP interface illustrated in FIGS. 3A and 3B. In particular, the bits LPT1EN and LPT2EN are used to indicate whether the parallel port has been configured as either LPT1 or LPT2 in order to enable the appropriate interrupt IRQ7 or IRQ5. These bits LPT1EN and LPT2EN are also used for generating the appropriate address decode signals as will be discussed below. The configuration bit EXTPP is used to allow bi-directional operation of the parallel port in a normal mode of operation. This configuration bit EXTPP may be controlled by a BIOS call or by a driver.

As mentioned above, the configuration register 22 interfaces with the system bus 26 as illustrated in FIG. 2. In particular, the system data bus DATA(7:0) is applied to the configuration register 22. In addition, in order to enable the CPU (not shown) to read and write to the configuration register 22, the system read and write control signals -IOR and -IOW, are also applied thereto.

The address decode circuitry 24 is used for address decoding during both a normal and EPP mode of operation. More specifically, as will be discussed in more detail below, the standard parallel port interface includes a data register 28 (FIG. 3B), a control register 30 (FIG. 3A) and a status register 32. The address mapping of these registers 28, 30 and 32 for a configuration of the parallel port as either LPT1 or LPT2 is illustrated in Table 4 below.

TABLE 4

| I/O Address | | |
| --- | --- | --- |
| LPT1 | LPT2 | Register Description |
| 378H,37CH | 278H,27CH | Data Register |
| 379H,37DH | 279H,27DH | Status Register |
| 37AH,37EH | 27AH,27EH | Control Register |
| 37BH,37FH | 27BH,27FH | unused address |

During an EPP mode of operation, the parallel port addresses between x7BH and x7FH are used for the EPP interface as shown in Table 5 below. However, as shown in Tables 4 and 5, the addresses x78H, x79H and x7AH for the standard parallel port registers 28, 30 and 32 remain unchanged during an EPP mode of operation.

TABLE 5

| I/O Address | | |
| --- | --- | --- |
| LPT1 | LPT2 | Register Description |
| 378H | 278H | Data Register |
| 379H | 279H | Status Register |
| 37AH | 27AH | Control Register |
| 37BH | 27BH | EPP Address Register |
| 37CH-37FH | 27CH-27FH | EPP Data register |

As mentioned above, the address decode circuitry 24 interfaces with the configuration register 22 as well as the system bus 26. In particular, the port number enable signals LPT1EN and LPT2EN as well as the EPP mode enable signal EPP-EN from the configuration register 22 is applied to the address decode circuitry 24. The system data bus DATA(7:0) as well as a system bus control signal AEN are also applied to the address decoding circuitry 24. The signal AEN indicates that the system bus 26 is busy with other tasks and is thus used to disable the address decoding circuitry during such conditions.

The address decode circuitry 24 thus generates various address decode signals which are used to select various registers as will be discussed below when the CPU writes to the addresses listed in Table 5 during both a normal mode of operation and an EPP mode of operation. The logic equations for the address decode circuitry 24 are provided in Appendix 1.

In particular, the address decode signals, -CSPDAT, -CSPCTRL and -CSPSTAT are decode signals for the data register 28, the control register 30 and the status register 32, respectively. These signals, -CSPDAT, -CSPSTAT and -CSPCTRL, are active low whenever the CPU writes to addresses x78H, x79H or x7AH, respectively, as indicated in Table 5.

The address decode signals CSEPPA and CSEPPD are used during an EPP mode of operation. The signal CSEPPA is active high during CPU reads or writes to address x7BH. The signal CSEPPD is active high during CPU reads or writes to addresses x7CH to x7FH. These signals CSEPPA and CSEPPD are ORed by way of an OR gate 34 and inverted by an inverter 36 to generate a signal, -CSEPP. The signal -CSEPP is active low for addresses between x7BH and x7FH during an EPP mode of operation.

The address decode signals CSEPPA and CSEPPD are also used to generate address and data strobe signals, EPP-AS and EPP-DS, respectively, used during an EPP mode of operation. In particular, the system read and write control signals -IOR and -IOW, respectively, are applied to inverting inputs of a NOR gate 38 whose output is inverted by an inverter 40. The output of the inverter 40, which indicates either an I/O read or write, is ANDed with the address decode signal CSEPPA by way of an AND gate 42 to generate an EPP address strobe signal EPP-AS. In a similar manner the output of the inverter 40 is ANDed with the address decode signal CSEPPD by way of an AND gate 44 to generate an EPP data strobe signal EPP-DS. Since the strobe signals are hardware generated, the software overhead for data transfer through the parallel port connector 20 during an EPP mode of operation can be reduced to a single instruction (e.g., REP OUTS DX, DWORD[S1]).

The address decode signals are also used to generate an EPP write signal EPPWR. In particular, the system write signal -IOW is applied to a inverting input of a buffer 46 and ANDed by way of an AND gate 48 with the output of the OR gate 34 to generate the EPP write signal EPPWR.

The external architecture of the EPP interface in accordance with the present invention may also include circuitry for controlling the cycles of the CPU as well as circuitry for enabling interrupts. In particular, parallel port interrupt enable and interrupt signals PPIEN and PPIRQ, available from the control register 30 and the status register 32 (FIG. 3), are used to generate the interrupts IRQ5 or IRQ7 depending on whether the parallel port is configured as LPT1 or LPT2. More particularly, the interrupt request signal PPIRQ is applied to tristate devices 50 and 52 to generate the interrupts IRQ5 and IRQ7, respectively, which, in turn, are applied to the system bus 26. The tristate devices 50 and 52 are under the control of AND gates 54 and 56, respectively. The signal LPT2EN from the configuration register 22 is ANDed with the interrupt enable signal PP-IEN by way of the AND gate 54 to enable the tristate device 50, which, in turn, generates the IRQ5 interrupt. In a similar manner, the signal LPT1EN, available from the configuration register 22, is ANDed with the interrupt enable signal PP-IEN by way of the AND gate 56 to enable the tristate device 52, which, in turn, generates the IRQ5 interrupt.

Another important aspect of the invention relates to the ability to program the speed of the data transfer rate through the parallel port connector 20. This is accomplished by way of an EPP ready signal EPPRDY which can be used to pull the bus channel ready signal IOCHRDY signal low to extend bus cycles during an EPP mode of operation. The EPP ready signal EPPRDY is a timing signal, available at an output of the status register 32. This signal EPP-RDY is inverted by way of an inverter 58 and ANDed by way of an AND gate 60 with the output of the OR gate 34 and the output of the buffer 40 which enables the transfer rate to be controlled both during read and write operations during an EPP mode of operation. The output of the AND gate 60 controls a tristate device 62, whose input is tied low. The output of the tristate device 62 is used to pull the IOCHRDY signal low on the system bus 26.

In order to clear the control register 30 as will be discussed below, the external architecture of the EPP interface may also include an inverter 64. The inverter 64 is used to generate an active low system reset signal -RESET which is applied to the control register 30.

INTERNAL ARCHITECTURE

Figure 3A:
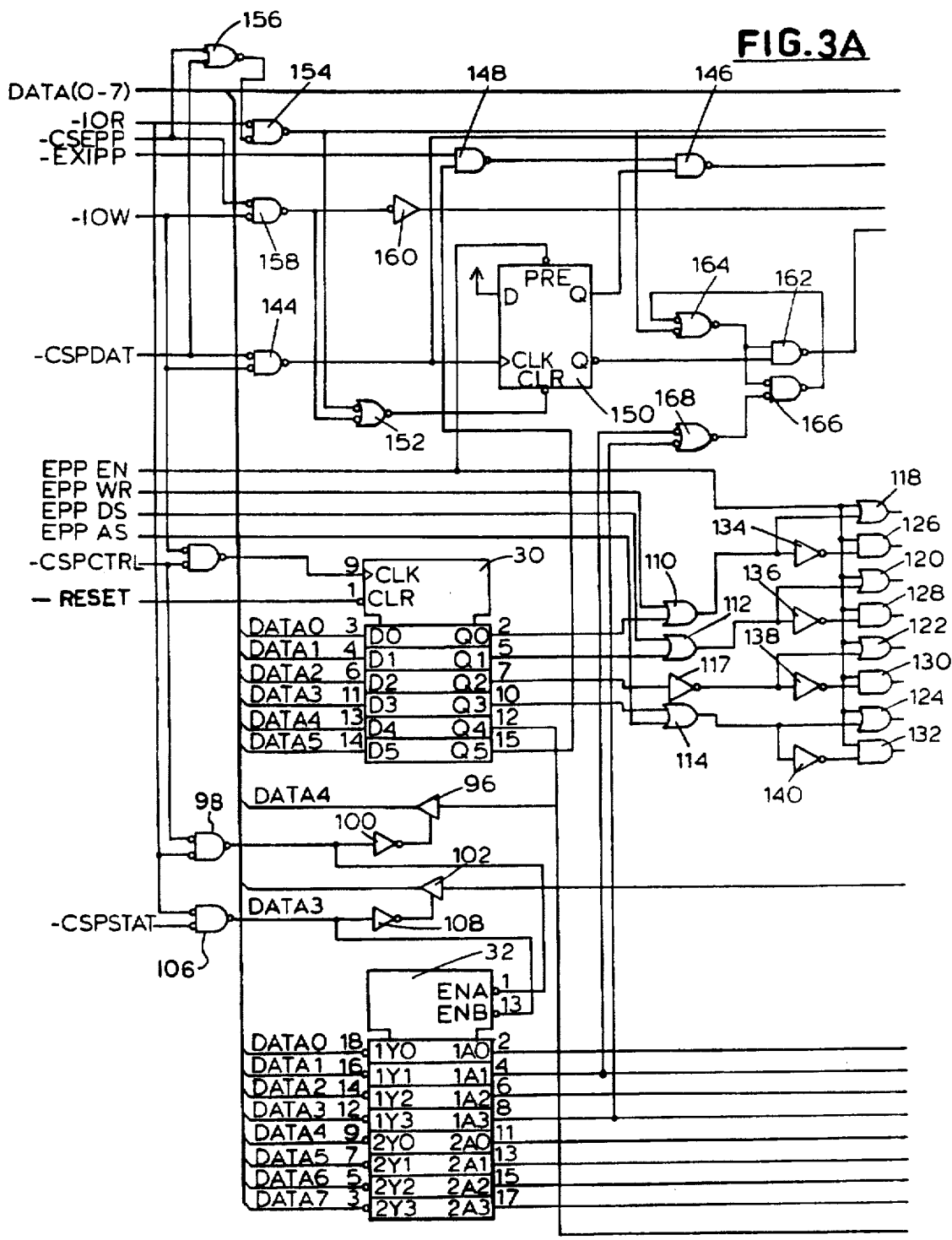
FIGS. 3A and 3B are a schematic diagram of the EPP interface in accordance with the present invention.
Figure 3B:
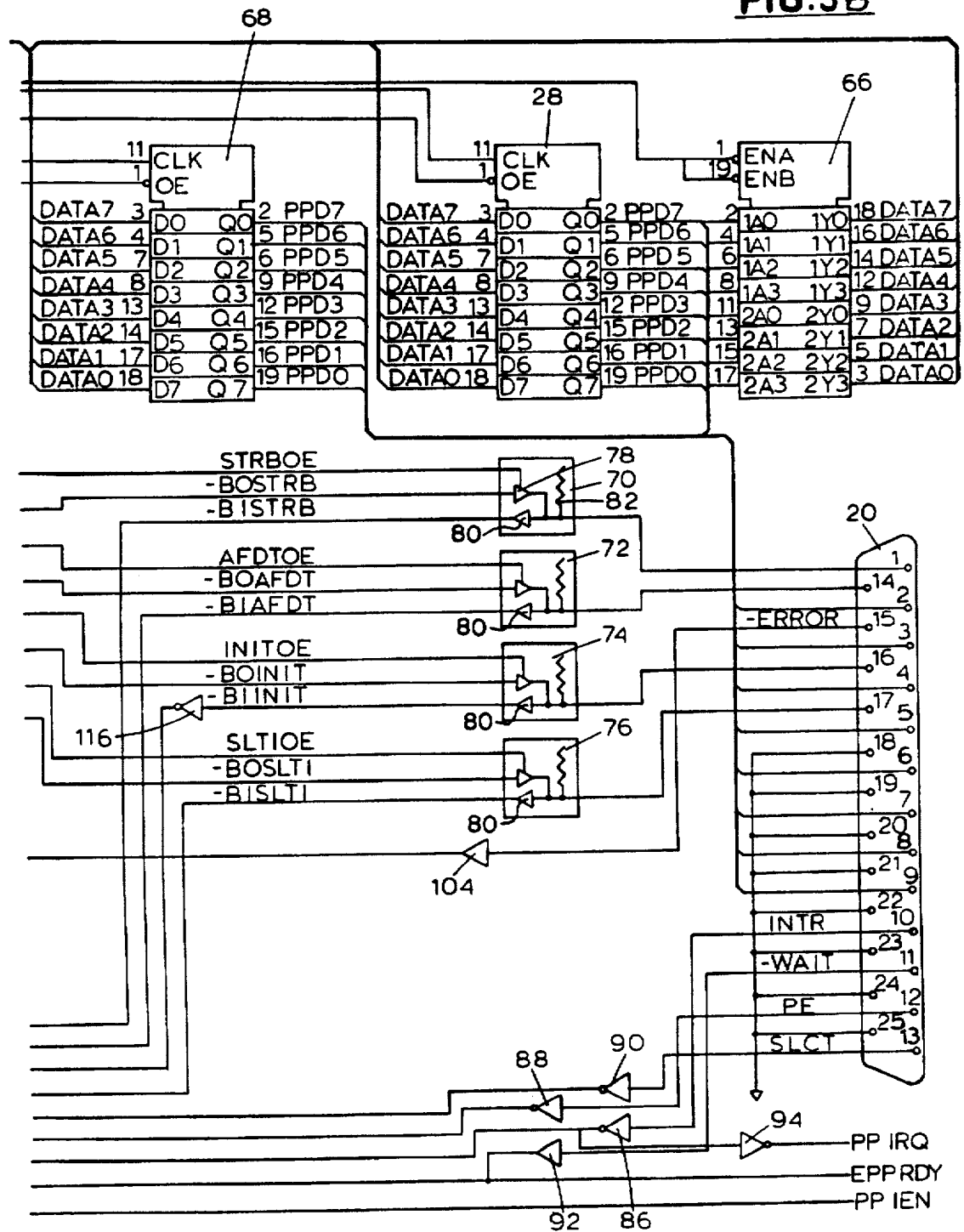

The internal architecture of the EPP interface logic in accordance with the present invention is illustrated in FIGS. 3A and 3B. The internal architecture includes a standard parallel port latch 28, a control register 30 and a status register 32 as well as an EPP write buffer 68 and an EPP read buffer 66. The EPP interface logic is connected to the 25 pin D connector 20 to enable data transfer through the connector 20 in both a normal mode of operation and an EPP mode of operation. In particular, the parallel port data bus PPD(7:0), available at the output of the standard parallel port write latch 28 and the EPP write buffer 68, are applied to pins 2–9 of the connector 20 to enable the CPU to write to the parallel port connector 20 both during a normal mode of operation and an EPP mode of operation. Pins 18–25 of the connector 20 are connected together and are tied to ground. As mentioned above, certain standard parallel port signals are redefined during an EPP mode of operation. In particular, these control signals are the -STROBE, -AFDXT, -INIT and -SLCTIN signals, available at pins 1, 14, 16 and 17, respectively. In order to enable the CPU to read these signals, these control signals -STROBE, -AFDXT, -INIT and -SLCTIN are buffered by a plurality of I/O buffers 70, 72, 74 and 76. Each I/O buffer 70, 72, 74, 76 includes a tristate device 78, a buffer 80 and a pull-up resistor 82. The I/O buffers 70, 72, 74 and 76 enable these signals to be read back by the CPU by way of the status register 32.

As mentioned above, the I/O buffers 70, 72, 74 and 76 are also used for interfacing with the connector 20. Thus, buffered output signals -BOSTRB, -BOAFDT, -BOINIT and -BOSLTI, developed by the control logic, as will be discussed below, are applied to the tristate devices 78 in the I/O buffers 70, 72, 74 and 76, respectively, which, in turn, are connected to pins 1, 14, 16 and 17 by way of the pull-up resistors 82. The tristate devices 78 in each of the I/O buffers 70, 72, 74 and 76 are under the control of output enable signals, STRBOE, AFDTOE, INITOE and SLTIOE.

The input of the internal buffer 80 of each of the I/O buffers 70, 72, 74 and 76 are connected to the output of the tristate device 78. This enables the buffered output signals, -BOSTRB, -BOAFDT, -BOINIT and -BOSLTI to be read back at the status register 32 as buffered input signals; -BISTRB, -BIAFDT and -BISLTI. More particularly, the buffered input signals -BISTRB, -BIAFDT and -BISLTI are applied directly to pins 1A0, 1A1 and 1A3 of the status register 32. The buffered input signal -BIINIT is applied to pin 1A2 of the status register 32 by way of an inverter 116.

It should be noted that when an EPP mode is enabled, normally open collector outputs from the signals; -STROBE, -AFDXT, -INIT and -SLCTIN are driven with 12 ma CMOS drivers. Although such CMOS drivers are not compatible with a standard parallel port interface, such drivers are necessary to decrease the rise time on the automatic strobes to allow for faster cycle times. During a normal mode of operation, these four interface signals may be used for bi-directional data transfer. However, when the EPP mode is enabled, peripheral devices should not be used to drive these signals since the signals are driven by the EPP interface. Thus, peripheral devices that attempt to drive these signals during an EPP mode of operation may cause damage to the EPP interface or the peripheral and thus should be avoided.

The handshake status signals; INTR, PE and SLCT, available at pins 10, 12 and 13 of the connector 20, are applied to the status register 32 by way of the inverters 86, 88 and 90, respectively. The handshake status signal, -WAIT, is applied to the status register 32 by way of a buffer 92. As such, the handshake status signals can be read by the CPU.

The interrupt request signal PPIRQ, as discussed above, is used to generate the IRQ5 and IRQ7 interrupts. This signal PPIRQ is available at the output of an inverter 94 whose input is tied to the output of the inverter 86.

The interrupt enable signal, PPIEN, discussed above, is available at a Q4 output terminal of the control register 30. The interrupt enable signal PPIEN is also adapted to be read by the CPU by way of a tristate device 96. More particularly, the interrupt enable signal PPIEN is applied to the input of the tristate device 96 whose output is applied to the DATA4 line of the system data bus. The tristate device 96 is under the control of a NAND gate 98 whose output is tied to a control input of the tristate device 96 by way of an inverter 100. An I/O read signal -IOR along with a control register decode signal -CSPCTRL are applied to inverting inputs of the NAND gate 98 to enable the tristate device 96 whenever the CPU initiates a read of the control register 30.

The parallel port error signal, -ERROR, available at pin 15 of the connector 20, may be read by the CPU in a similar manner. More particularly, the -ERROR signal is applied to a tristate device 102 by way of a buffer 104. The output of the tristate device 102, in turn, is applied to the DATA3 line of the system data bus. The tristate device 102 is under the control of a NAND gate 106 by way of an inverter 108. The system I/O read signal -IOR and the address decode signal -CSPSTAT are applied to inverting inputs of the NAND gate 106 to enable the tristate device when the CPU initiates a read of the status register 32.

The control register 30 is normally used for standard parallel ports. The system data bus DATA(5:0) is connected to the D0–D5 inputs of the control register 30 to enable the CPU to write to it during a normal mode of operation. The control register output signals Q0–Q3 are used to generate the standard parallel port control signals; -STROBE, -AFDXT, -INIT and -SLCTIN during a normal mode of operation. Thus, during a normal mode of operation, these signals -STROBE, -AFDXT, -INIT and -SLCTIN are software driven and account for the software overhead discussed above. However, during an EPP mode of operation, the address and data strobe signals EPP-AS and EPPDS, as well are the EPP write signal EPP-WR are hardware driven as discussed in connection with the external EPP architecture. Thus, by utilizing such hardware driven signals, the software overhead can be significantly reduced from about 4–6 instructions to 1 instruction as discussed above. Accordingly, the bandwidth of the parallel port can be significantly increased.

In order to redefine that signals -STROBE, -AFDXT, -INIT and -SLCTIN in an EPP mode of operation, the Q0, Q1 and Q3 output signals of the control register 30 are ORed with the EPP-WR; EPP-DS and EPP-AS signals by way of a plurality of OR gates 110, 112 and 114, respectively. The Q2 output from the control register 30 is applied to an inverter 117. During a normal mode of operation, the EPP mode control signals are low. Thus, during such a condition, the OR gates 110, 112 and 114 are under the control register 30 as is the inverter 117 to generate the standard parallel port control signals. However, during an EPP mode of operation, the control register 30 is cleared by the EPP software (which may be a BIOS call or a driver) prior to performing an EPP cycle. In this situation, the OR gates 110, 112 and 114 are under the control of the hardware generated EPP write and strobe signals, EPP-WR, EPP-DS and EPP-AS in order to redefine the pin functions as defined in Table 2.

The EPP mode signals include a write signal EPPWR, a data strobe signal EPPDS and an address strobe signal EPPAS and an interrupt signal INTR. As mentioned above, the interrupt signal INTR functions the same as the ACK signal used during a normal mode of operation.

As mentioned above, both the normal and EPP mode signals are applied to the OR gates 110, 112 and 114. Thus, the outputs of the OR gates 110, 112 and 114 along with the output of the inverter 117 are ORed with an EPP enable signal EPP-EN by way of the OR gates 118, 120, 122 and 124. The outputs of the OR gates 118, 120, 122 and 124 are used to generate the output enable signals; STRBOE, AFDTOE, INITOE and SLTIOE, which are applied to the tristate devices 78 within the I/O buffers 70, 72, 74 and 76. During a normal mode of operation the EPP enable signal EPPEN is low. Thus, during such a condition, the OR gates 118, 120, 122 and 124 are under the control of the OR gates 110, 112 and 114 and the inverter 117 to enable the normal mode pin functions to be selected by the CPU by way of the control register 30 as defined in Table 1.

The outputs of the OR gates 110, 112 and 114 as well as the inverter 117 are applied to inputs of AND gates 126, 128, 130 and 132 by way of inverters 134, 136, 138 and 140 along with an EPP enable signal EPP-EN. The outputs of the AND gates 126, 128, 130 and 132 are used to generate the buffered output signals -BOSTRB, -BOAFDT, -BOINIT and -BOSLTI, which are applied to the tristate devices 78 in each of the I/O buffers 70, 72, 74 and 76. The output of these tristate devices 78 are then applied to pins 1, 14, 16 and 17 of the parallel port connector 20.

During a normal mode of operation, the AND gates 126, 128, 130 and 132 are disabled since the EPP-EN signal is low during such a condition. However, once in the EPP mode, the AND gates 126, 128, 130 and 132 are under the control of the OR gates 110, 112 and 114 and the inverter 117.

As mentioned above, the control register 30 is a six bit register. The system data bus DATA(5:0) is applied to the D0–D5 inputs of the control register to enable the CPU to write to it. Data can be written to the control register under the control of a NAND gate 142. A system write signal -IOW as well as a control register decode signal -CSPCTRL are applied to inverting inputs of the NAND gate 142 whose output is applied to a clock CLK input of the control register 30 to enable the control register 30 any time the CPU writes to the control register address as listed in Tables 4 and 5 above. The control register 30 is reset by way of a system reset signal -RESET which is applied to a clear input CLR of control register 30. The control register 30 is cleared by EPP software before EPP transfers are performed, as mentioned above.

The status buffer 32 is an eight bit buffer. The system data bus DATA(7:0) is applied to the 1Y0–1Y3 and the 2Y0–2Y3 outputs of the status register 32. The output pins 1Y0–1Y3 outputs are read by the CPU as control signals under the control of the NAND gate 98 whose output is applied to an ENA input of the status buffer 32. The 2Y0–2Y3 outputs are read by the CPU as status signals under the control of the NAND gate 106 whose output is applied to an ENB output of the status buffer 32.

The standard parallel port write latch 28 is an eight bit edge triggered latch. As mentioned above, the parallel port data bus PPD(7:0) is applied to the Q0–Q7 outputs. The system data bus DATA(7:0) is applied to the D0–D7 inputs of the write latch 28 to enable the CPU to write to it.

Data is written to the write latch 28 under the control of a NAND gate 144 whose output is applied to a clock input of the write latch 28. The system read control signal -IOW and the chip select signal -CSPDAT are applied to inverting inputs of the NAND gate 144. Thus, the output of the NAND gate 144 will be active when both the -IOW and -CSPDAT signals are active. Data is latched by the write latch 144 when the output from the NAND gate 144 goes from a low or active state to a high or inactive state.

The output control of the write latch 28 is under the control of a NAND gate 146. In particular, the output of the write latch 28 is enabled whenever the NAND gate 146 goes low. The NAND gate 146 is under the control of another NAND gate 148 and a flip-flop 150. Thus, in order to enable the output control of the write latch 28, both outputs of the NAND gate 148 and the flip-flop 150 must be high.

The flip-flop 150 is used to enable the standard write latch 28 in an EPP mode of operation when the standard data port is accessed. When the EPP mode is disabled, the EPP-EN signal will be inactive, which deasserts a PRESET pin of the flip-flop 150 forcing the Q output of the flip-flop 150 high. During an EPP mode of operation, the EPP-EN signal is asserted. During such a condition, a write to the standard parallel data port will cause the Q output to go high. The Q output of the flip-flop 150 will go high in response to its clock CLK input transitioning from a low to high. The clock CLK input of the flip-flop 150 is driven by the NAND gate 144 discussed above. The Q output of the flip-flop 150 is cleared by the output of a NOR gate 152 going low. The output of the NOR gate 152 will go low when the chip select signal -CSEPP signal is asserted and either the -IOR or -IOW signals are asserted. The other input to the NAND gate 146 is from the NAND gate 148, whose output will go high when the EXTPP input is low or the Q5 output of the control register 30 is low.

The read buffer 66 is an eight bit latch used for transferring data from the parallel port connector 20 during both standard parallel port and EPP read cycles. The output enable inputs ENA and ENB for the read buffer 66 is under the control of a NAND gate 154, which is active low. A system I/O read control signal -IOR is applied to an inverting input of the NAND gate 154. The output of a NOR gate 156 is applied to another inverting input of the NOR gate 156. The chip select signals -CSEPP and -CSPDAT are applied to inverting inputs of the NOR gate 156. Thus, since the output enable for the read buffer 66 is active low, the output will be enabled whenever the I/O read signal -IOR is active and either of the chip select signals -CSEPP or -CSPDAT are active to enable the read buffer 66 during both normal and EPP read cycles.

The chip select signal -CSEPP is active during an EPP mode of operation whenever the CPU addresses 37BH–37FH (LPT1) or 27BH–27FH (LPT2). The chip select signal -CSPDAT is the standard parallel data for chip select. This signal -CSPDAT will go active whenever the CPU asserts the address 378H (LPT1) or 278H (LPT2).

The write buffer 68 is an eight bit transparent latch used to buffer data from the CPU to the parallel port connector 20 during EPP write cycles. Data is transferred to the write buffer 68 under the control of a NAND gate 158 by way of an inverter 160; whose output is applied to the clock input CLK of the write latch 68. An I/O write signal -IOW and the chip select signal -CSEPP are applied to the inverting inputs of the NAND gate 158 to cause the NAND gate 158 to go active when the signals -IOW and -CSEPP are both active, indicating a write to the EPP port.

The output enable control of the write latch 68 is under the control of a NAND gate 162, which is active low. A $\overline{Q}$ output from the flip-flop 150 is applied to one input of the NAND gate 162 along with an output from a NOR gate 164. Two signals are applied to inverting inputs of the NOR gate 164. One signal is from the output of the NAND gate 154. The other signal is from an output of a NAND gate 166. An output signal from the NOR gate 164 is applied to one inverting input of the NAND gate 166 forming a latch. An output from a NOR gate 168 is applied to another inverting input of the NAND gate 166. The address strobe signal -ASTRB and the data strobe signals -DSTRB, available at the status buffer 32, are applied to inverting inputs of the NOR gate 168.

In operation, the output control of the latch 68 is driven by the NAND gate 162. The output of the NAND gate 162 will go active when the $\overline{Q}$ output of the flip-flop 150 is high and the output of the NOR gate 164 is high. The $\overline{Q}$ output of the flip-flop 150 operates in the same manner as the Q output discussed above, except it is the reverse polarity. During an EPP write cycle, the signals -CSEPP and -IOW are asserted causing the Q output of the flip-flop 150 to go high. Before the EPP write cycle begins, both the BIAFDT and BISLTI signals will be high forcing the output of the NOR gate 168 to be high, which, in turn, causes the output of the NAND gate 166 to be high. Since the -IOR signal will be deasserted during write cycles, the output of the NOR gate 164 will be high in order to enable the write latch 68.

During an EPP read cycle, the -IOR and -CSEPP signals will be asserted causing the output of the NOR gate 164 to go low, which, in turn, causes the output of the write latch 68 to be tristated, allowing a peripheral to drive the parallel port data bus PPD(7:0). Also, during an EPP read cycle, one of the EPP strobe signals -DSTRB or -ASTRB will be asserted after some gate delay. This causes the BIAFDT and BISLTI signals to be asserted. The output of the NOR gate 164 will thus be held low by the output of the NAND gate 166 until the BIAFDT or BISLTI signals are deasserted, which occurs after a short gate delay after the strobe signals -DSTRB and -ASTRB are deasserted. The -DSTRB and -ASTRB strobe signals are deasserted following a short gate delay after the -IOR signal is deasserted by the CPU.

While the invention has been described with reference to details of the embodiments shown in the drawings and described herein, these details are not intended to limit the scope of the invention as described in the appended claims.

What is claimed and desired to be secured by a Letters Patent of the United States is:

APPENDIX 1

ADDRESS DECODE LOGIC EQUATIONS

The following shows the equations for the outputs of the address decode circuitry 24, illustrated on FIG. 1 of the drawing.

| Signal | Equation |
| --- | --- |
| -cspdat | !aen & (lpt1en & (addr == 378H) # lpt2en & (addr == 278H)); |
| -cspctrl | !aen & (lpt1en & (addr == 37AH) # lpt2en & (addr == 27AH)); |
| -cspstat | !aen & (lpt1en & (addr == 379H) # lpt2en & (addr == 279H)); |
| cseppd | !aen & (lpt1en & (addr == 37CH-37FH) # lpt2en & (addr == 27CH-27FH)) |
| cseppa | !aen & (lpt1en & (addr == 37BH) # lpt2en & (addr == 27BH)). |

What is claimed and desired to be secured by a Letters Patent of the United States is:

1. A control system for enabling the data transfer rate of a standard parallel port to be varied in a personal computer, said personal computer including central processing unit (CPU), a system bus and a standard parallel port, said standard parallel port inter-connected to said system bus, the control system comprising:

first means for providing a first pre-determined group of signals representative of standard parallel port signals during a first predetermined standard mode of operation for controlling the transfer of data between the standard parallel port and an external device adapted to be connected to the standard parallel port, said first pre-determined group of signals including first pre-determined strobe signals for controlling the data transfer rate through the standard parallel port, wherein said first predetermined group of strobe signals are software generated;

second means for providing a second predetermined group of signals during a second predetermined non-standard mode of operation for controlling the transfer of data through the standard parallel port, between the system bus and an external device adapted to be connected to the standard parallel port, said second predetermined group of signals redefining a predetermined subset of said first predetermined group of signals with alternate parallel port functions, said second predetermined group of signals including relatively faster generation of second predetermined strobe signals relative to said first determined strobe signals for controlling the data transfer through the standard parallel port at a relatively faster data transfer rate than in said first predetermined mode of operation, wherein in said second mode of operation one or more of said second predetermined strobe signals are hardware generated, said second means further including means for controlling data lines in said parallel port which are unidirectional in said first predetermined mode of operation to be bi-directional in said second predetermined mode of operation, whereby data may be transferred in a bi-directional direction through said parallel port; and means for selectively enabling said first and second modes of operation.

2. A control system for controlling the data transfer rate of a standard parallel port, said control system including a data port, a control register and a personal computer, said personal computer including a central processing unit (CPU), a system bus and a standard parallel port interconnected to said system bus, the control system comprising:

means for controlling the transfer of data through the standard parallel port, between the system bus and an external device adapted to be connected to the standard parallel port, at a first predetermined transfer rate, said controlling means including means for enabling data to be written to the data port and subsequently generating one or more predetermined strobe signals under program control after said data is written to the data port to enable said data to be transferred;

means for controlling data lines in said parallel port to enable bi-directional data transfer through said parallel port; and means for selectively increasing and decreasing said predetermined transfer rate through the standard parallel port to said external device by redefining a predetermined subset of standard parallel port functions with alternate parallel port functions, said increasing and decreasing means including means for automatically generating said one or more predetermined strobe signals under hardware control when said data is written to the data port.

3. A control system for a personal computer which includes a central processing unit (CPU), a system bus and a standard parallel port, said standard parallel port including a data port and a control register, said standard parallel port interconnected to the system bus, the control system comprising:

means for transferring data through said parallel port, between the system bus and an external device adapted to be connected to the standard parallel port, said transferring means including means for enabling data to be written to the data port and enabling said data to be transferred from the standard parallel port to said external device after one or more predetermined strobe signals are generated, said transferring means further including means for controlling data lines in said parallel port to enable bi-directional data transfer through said parallel port; and means for selectively increasing and decreasing the rate at which data is transferred through said standard parallel port to said external device by redefining a predetermined subset of standard parallel port functions with alternate parallel port functions; said increasing and decreasing means including means for automatically generating said one or more predetermined strobe signals after data has been written to the data port.

4. A control system as recited in claim 3, wherein said transferring means includes means for generating predetermined signals.

5. A control system as recited in claim 4, wherein said predetermined signals include an address strobe signal and a data strobe signal.

6. A control system as recited in claim 5, wherein said address strobe signal is hardware generated during certain predetermined conditions.

7. A control system as recited in claim 5, wherein said address strobe signal is software generated during certain predetermined conditions.

8. A control system as recited in claim 5, wherein said data strobe signal is hardware generated during certain predetermined conditions.

9. A control system as recited in claim 5, wherein said data strobe signal is software generated during certain predetermined conditions.

10. A control system for a personal computer which includes a central processing unit (CPU), means for storing instructions for execution by the CPU, a system bus connected between the CPU and the standard parallel port which includes a data port and a control register, the control system comprising:

means for transferring data through said parallel port, between the system bus and the standard parallel port, said transferring means being responsive to a predetermined group of signals generated under program control including a predetermined number of predetermined program instructions in a first mode of operation; and means for reducing said predetermined number of said predetermined program instruction by automatically generating through hardware one or more signals of said predetermined group of signals in a second mode of operation wherein in said second mode of operation a predetermined subset of standard parallel port functions are substituted with alternate parallel port functions, said alternate parallel port functions including enabling data lines in said parallel port which are unidirectional in said first mode of operation to be bi-directional in said second mode of operation, whereby data may be transferred in a bi-directional direction through said parallel port.

11. A process for transferring data at different transfer rates in a personal computer which includes a central processing unit (CPU) a system bus and a standard parallel port interconnected to said system bus, said standard parallel port including a data port and a control register; the processing comprising steps of:

(a) selecting between a first mode of operation for transferring data between the standard parallel port and an external device adapted to be connected to the standard parallel port at a first predetermined data transfer rate and a second mode of operation for transferring data between the external device and the standard parallel port at a second predetermined data transfer rate, said second predetermined data rate being relatively faster than said first predetermined data transfer rate; and (b) generating a set of control signals for transferring data during the selected mode of operation, wherein in said first mode of operation, data is transferred to the standard parallel port by transferring data to the data port and one or more predetermined strobe signals are generated under program control and in a second mode of operation wherein a predetermined subset of standard parallel port functions are substituted with alternate parallel port functions, wherein data lines in said parallel part are enabled to transfer data in a bi-directional direction through said parallel port and wherein one or more of said predetermined strobe signals are automatically generated after said data is transferred to the data port.

12. A control system for a personal computer which includes a central processing unit (CPU), means for storing instructions for execution by the CPU, a system bus connected between the CPU and the standard parallel port which includes a data port and a control register, the control system comprising:

a first mode control circuit for providing a first predetermined group of signals representative of standard parallel port signals during a first predetermined standard mode of operation for controlling the transfer of data from the system bus through the standard parallel port to an external device adapted to be connected to the standard parallel port, said first predetermined group of signals including first pre-determined strobe signals for controlling the data transfer rate through the standard parallel port, wherein said first predetermined group of strobe signals are software generated;

a second mode control circuit for providing a second predetermined group of signals during a second predetermined non-standard mode of operation for controlling the transfer of data through the standard parallel port to a device adapted to be connected to the standard parallel port, said second predetermined group of signals redefining a predetermined subset of said first predetermined group of signals, said second predetermined group of signals including relatively faster generation of second predetermined strobe signals relative to said first determined strobe signals for controlling the data transfer through the standard parallel port at a relatively faster data transfer rate than in said first predetermined mode of operation, wherein in said second mode of operation one or more of said second predetermined strobe signals are hardware generated and wherein data lines in said parallel port are enabled to transfer data in a bi-directional direction through said parallel port; and a mode selector for selectively enabling said first and second mode control circuits.

* * * * *

UNITED STATES PATENT AND TRADEMARK OFFICE
CERTIFICATE OF CORRECTION

PATENT NO. : 5,636,348
DATED : June 3, 1997
INVENTOR(S) : Buxton

It is certified that error appears in the above-indentified patent and that said Letters Patent is hereby corrected as shown below:

Column 15, line 29, change "part" to --port--.

Signed and Sealed this

Ninth Day of September, 1997

Attest:

BRUCE LEHMAN

Attesting Officer      *Commissioner of Patents and Trademarks*